United States Patent
Huhn, III

(10) Patent No.: US 7,135,157 B2
(45) Date of Patent: Nov. 14, 2006

(54) PROCESS FOR THE PRODUCTION OF PLATY PRECIPITATED CALCIUM CARBONATES

(75) Inventor: Harry John Huhn, III, Catasauqua, PA (US)

(73) Assignee: Specialty Minerals (Michigan) Inc., Bingham Farms, MI (US)

( * ) Notice: Subject to any disclaimer, the term of this patent is extended or adjusted under 35 U.S.C. 154(b) by 492 days.

(21) Appl. No.: 10/456,706

(22) Filed: Jun. 6, 2003

(65) Prior Publication Data

US 2004/0247513 A1   Dec. 9, 2004

(51) Int. Cl.
*C01F 11/18* (2006.01)
*C09C 1/02* (2006.01)
*C08K 3/26* (2006.01)

(52) U.S. Cl. .................. 423/432; 423/161; 423/165; 423/430; 106/464; 524/788

(58) Field of Classification Search ............. 423/432, 423/430, 266
See application file for complete search history.

(56) References Cited

U.S. PATENT DOCUMENTS

| | | | |
|---|---|---|---|
| 3,320,026 A | 5/1967 | Waldeck | |
| 4,714,603 A | 12/1987 | Vanderhieden | |
| 4,857,291 A | 8/1989 | Ota et al. | |
| 5,007,964 A * | 4/1991 | Tsukisaka et al. | 106/464 |
| 5,075,093 A * | 12/1991 | Tanaka et al. | 423/432 |
| 5,643,415 A | 7/1997 | Wise | |
| 5,647,902 A | 7/1997 | Wu | |
| 5,811,070 A * | 9/1998 | You | 423/432 |
| 6,312,659 B1 | 11/2001 | Wise | |

FOREIGN PATENT DOCUMENTS

| | | |
|---|---|---|
| EP | 0 429 707 | 3/1996 |
| EP | 1 151 966 | 11/2001 |
| JP | 2-184519 | 7/1990 |
| JP | 08-249128 | 9/1996 |

OTHER PUBLICATIONS

"Effects of Macromolecules on the Crystallization of $CaCO_3$ the Formation of Organic/Inorganic Composites", Kato et al., Supramolecular Science, vol. 5, Nos. 3-4, 1998.
"Precipitation of Calcium Carbonate in Aqueous Systems", Z. Amjad, Tenside Surf. Det. 36 (1999), pp. 162-167.

* cited by examiner

*Primary Examiner*—Stuart Hendrickson
*Assistant Examiner*—Alvin T Raetzsch
(74) *Attorney, Agent, or Firm*—Leon Nigohosian, Jr.; George H. Fairchild

(57) ABSTRACT

A process for the preparation of platy precipitated calcium carbonate comprising the steps of providing a suspension of calcium hydroxide, carbonating the suspension of calcium hydroxide, adding a polyacrylate to the suspension prior to the completion of carbonation to precipitate platy calcium carbonate. Also provided are a paper that is filled and a paper that is coated using the platy precipitated calcium carbonate according to the present invention.

11 Claims, 2 Drawing Sheets

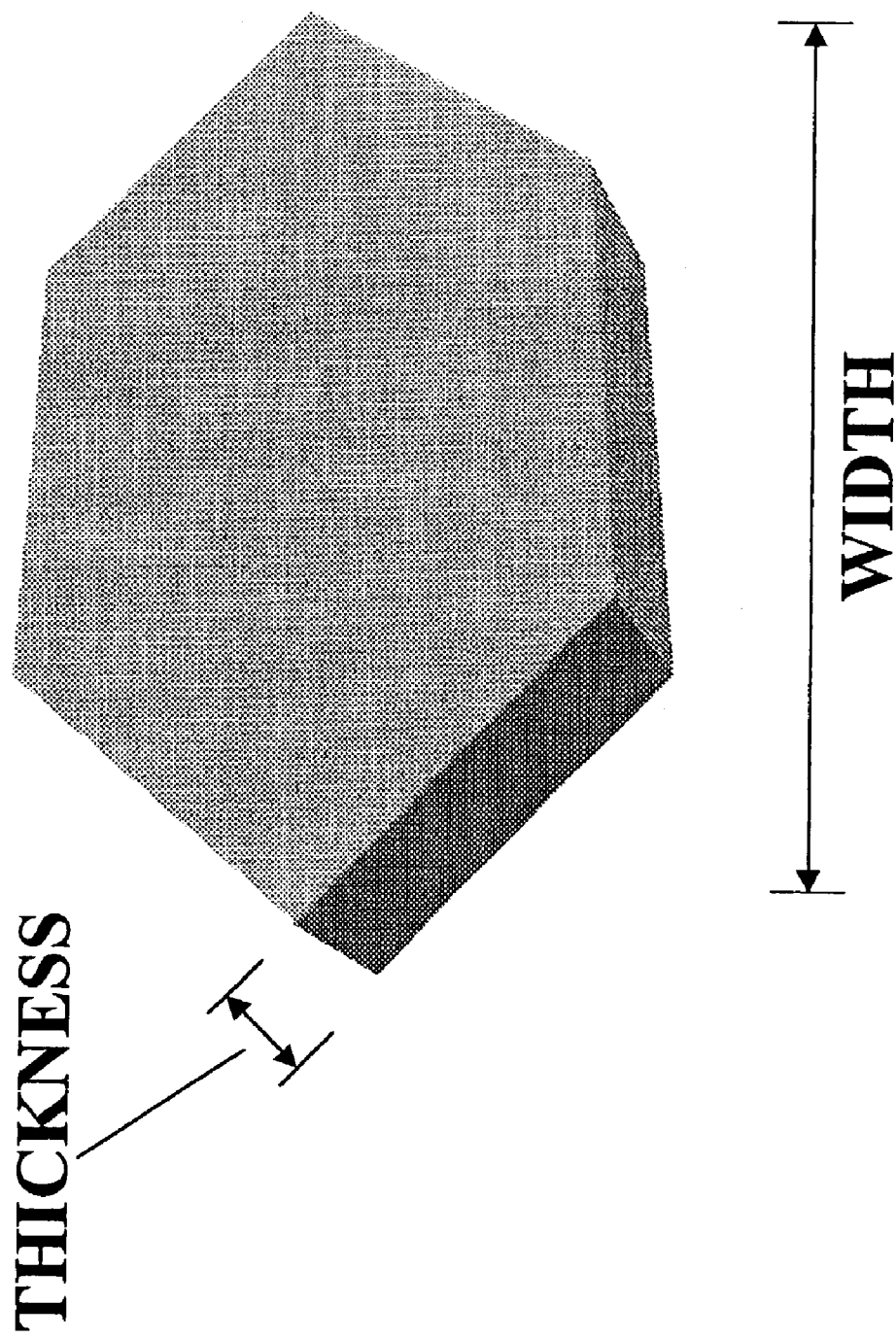

PROCESS FOR THE PRODUCTION OF PLATY PRECIPITATED CALCIUM CARBONATES

DETAILED DESCRIPTION OF THE INVENTION

What is needed is a novel method for producing platy precipitated calcium carbonate (PCC) that is economical to use.

The present invention provides a process and a product produced by that process. What is herein disclosed is a method for producing platy PCC having the steps of providing an aqueous suspension of calcium hydroxide, carbonating the suspension of calcium hydroxide, called a slurry, adding a polyacrylate to the slurry prior to the completion of carbonation to precipitate platy calcium carbonate. A paper that is filled with the platy PCC produced by this process is also provided. Additionally, it is envisioned that the platy PCC made according to the present invention can be used as a coating for paper or as a filler for polymers.

The product produced by the process, primarily a calcite, normally is comprised of platelets having a width of from about 0.4 microns to about 1.5 microns and a thickness of from about 0.05 microns to about 0.2 microns, a particle size distribution (PSD) having 90 weight percent of the particles lie below about 2.5 microns and 50 weight percent of the particles below about 1.5 microns, and a specific surface area of from about 8 to about 20 square meters per gram.

Shown in FIG. 1 is a photomicrograph at a magnification of 10,000× of an exemplary precipitated platy calcium carbonate according to the present invention prepared as Example #1 described in detail below. Shown in FIG. 2 is a schematic drawing of a precipitated calcium carbonate particle illustrating the dimensional characteristics of the substantially platy morphology according to the present invention and the manner in which the width and thickness were measured.

It has been found that the aforesaid platy PCC of the present invention can be made by a controlled process that entails controlling the time at which the addition of a polyacrylate occurs during the carbonation of the lime slurry. In brief, the process for producing the platy PCC of the present invention involves the reaction of calcium hydroxide, $Ca(OH)_2$, with carbon dioxide, $CO_2$, in the presence of a polyacrylate, preferably in the form of a polyacrylic acid or a neutralized polyacrylate salt. The polyacrylate is provided after the initiation and prior to the completion of the carbonation reaction.

More specifically, the process according to the present invention includes the steps of slaking lime (CaO) by adding water to form a $Ca(OH)_2$ suspension with a concentration of from about 0.09 grams to about 0.14 grams $Ca(OH)_2$/milliliter (ml) of slake suspension and, more preferably, from about 0.11–0.13 g $Ca(OH)_2$/ml of slake suspension. After slaking, the temperature is adjusted by circulating chilled water through the outer jacket of the reaction vessel while mixing the reactants thoroughly to bring the slake to a desired temperature before carbonation is initiated. The starting carbonation temperature can range between from about 8 degrees Celsius to about 18 degrees Celsius, with a temperature between from about 10 degrees Celsius to about 18 degrees Celsius being preferred and a temperature of between from about 12 degrees Celsius to about 18 degrees Celsius being most preferred.

Carbonation of the slurry is then performed by adding $CO_2$ gas into the $Ca(OH)_2$ suspension with thorough agitation. The gas flow rate is adjusted to achieve a target carbonation time of from about 100 minutes (min) to about 150 minutes, which typically requires from about 0.0022 liters to about 0.0033 liters $CO_2$/minute/gram $Ca(OH)_2$. The nature of the carbon dioxide gas for the carbonation is not particularly critical, which may be provided pure or in the standard mixtures of carbon dioxide in either nitrogen or air commonly used for such carbonations. Likewise, the nature of the source for the starting calcium hydroxide slurry is not critical. The purity of the carbonating gas, water, and the lime essentially determine the purity of the final product.

During carbonation, the electrical conductivity of the reaction mixture is measured using a conductivity meter or cell such as those available from Cole-Parmer Instrument Company, Vernon Hills, Ill. or Extech Instruments Corporation, Waltham, Mass. When the reaction mixture during carbonation begins a sudden, characteristic drop in conductivity the addition of a polyacrylate to the slurry is initiated with thorough agitation. Conductivity as used herein refers to the electrical conductivity properties of an aqueous slurry, which is due to the presence of ions (e.g., $Ca^{2+}$, $OH^-$) in the aqueous phase. The measurement that is made during the carbonation process is actually the specific conductivity, which is a measure of the electrical conductivity of the aqueous slurry through 1 centimeter (cm) of the slurry. The units for specific conductivity are milliSiemens per centimeter (mS/cm). The drop in conductivity at which the polyacrylate addition is made occurs when the conductivity decreases at a rate of about 0.02 milliSiemens to about 0.04 milliSiemens per centimeter per second (mS/cm/sec). Typically, this decrease in conductivity occurs when the step of carbonating the suspension of $Ca(OH)_2$ to $CaCO_3$ is 60 percent to 70 percent complete. This point may also be determined by using titration to determine when about 60 percent to about 70 percent of the $Ca(OH)_2$ has been reacted with the $CO_2$.

Preferably, the polyacrylate is added to the slurry as an aqueous solution in amounts of ranging from at least about 1 percent by weight of dry polyacrylate on dry PCC yield. The polyacrylates that may be employed in the instant process generally have molecular weights of from about 2000 to about 10,000 and include specific polyacrylic acids which are available as surfactants commonly used as scale inhibitants, sequestrants, deflocculants and detergent promoters. The polyacrylate may also be provided as specific sodium or ammonium polyacrylate salts that, preferably, are sulfite or phosphonate terminated polyacrylates. Although the polyacrylates according to the present invention are polycarboxylic acids, it has been discovered that the specific polyacrylic acids and neutralized polyacrylic salts set forth below are effective additives in the formation of platy PCC.

Commercially available polyacrylates useful in the process of the present invention are COLLOID 102, COLLOID 110, COLLOID 140, COLLOID 180, COLLOID 200, COLLOID 204, COLLOID 220, COLLOID 240, COLLOID 260, COLLOID 280, COLLOID 284, and FENNODISPO A42 which are available from Kemira Chemicals, Helsinki, Finland; and ACUMER 9300 and ACUMER 9470 which are available from Rohm and Haas Company, Philadelphia, Pa.

As described above, the carbonation reaction of the process of the present invention is initiated at a temperature between about 8 degrees Celsius to about 18 degrees Celsius and subsequently reacts over a broad temperature range, of from about 8 degrees Celsius to about 80 degrees Celsius, with from about 10 degrees Celsius to about 70 degrees Celsius being typical, and from about 15 degrees Celsius to about 60 degrees Celsius being most typical. When the starting carbonation temperature is above about 16 degrees Celsius, citric acid is preferably added in amount of up to about 0.15 percent by weight dry citric acid on dry PCC yield to help ensure formation of the platy PCC which could otherwise be inhibited due to variations in such factors as the raw starting material characteristics and reaction rate of carbonation. Citric acid may also be added to the slake at any time prior to carbonation to provide a thinner platy PCC having an increased surface area over the platy PCC produced using no citric properties which are desirable in most applications (e.g., paper filling and coating). The carbonation of the lime slurry is continued until the precipitation reaction is substantially complete and, preferably, terminated when the pH of the carbonated slurry is at about 7.5 to about 8.0. Such carbonation is usually accomplished in a period of about 4 hours or less, a period of from about 120 minutes to about 180 minutes being preferred, with the reaction time being adjusted by controlling the $CO_2$ gas flow rate and typical carbonation rates being from about 0.0022 liters to about 0.0033 liters $CO_2$/minute/gram $Ca(OH)_2$.

The calcium carbonate in the final slurry may be utilized as such, concentrated and dispersed at high solids for use in paper coatings, or may be filtered, dried and milled for use as a dry product.

The product of the present invention has been found to be especially useful as a filler in paper, polymers, and paint, and as a paper coating pigment.

The following non-limiting examples are provided to more specifically teach and set forth particular embodiments of the present invention as envisioned here. They are for illustrative purposes only, however, and are not to be construed as limiting the invention. It is recognized that minor changes and alterations can be made to the process parameters and components that are not specifically contemplated herein. However, to the extent any such changes or alterations do not materially change or affect the process or the final product, it is to be understood that such changes also fall within the scope of the invention as defined by the claims that follow.

As referred to below, specific surface area refers to the area of the surface of a particle per unit weight based on the quantity of nitrogen gas that absorbs as a single layer of gas molecules on the particle. Once the gas adsorption properties of the material in question have been measured, then the surface area of the material in question is calculated using the Brunauer-Emmett-Teller (BET) equation, Micromeritics Flowsorb 2300 Instruction Manual, 1986. The average particle size distributions of the particles produced according to the present invention were determined by using a Micromeritics Sedigraph 5100 Analyzer which uses x-rays to measure sedimentation rate relative to size. The width and thickness of the platelet-shaped particles were measured using a Philips XL-20 scanning electron microscope.

EXAMPLE 1

Platy PCC on 4 Liter Scale with Polyacrylic Acid Addition

Into a 4-liter stainless reactor equipped with twin gas dispersion impellers and a $CO_2$ injection tube there was introduced 2100 milliliters (ml) of water heated to 45 degrees Celsius. To the water was added 210 grams (g) of calcium oxide (CaO) while mixing at 750 revolutions per minute for 10 minutes to provide a resultant $Ca(OH)_2$ slurry having a concentration of 0.12 grams $Ca(OH)_2$/ml of slake slurry as determined by methyl orange (M.O.) titration with 1 Normal (N) hydrochloric acid.

The $Ca(OH)_2$ slurry was cooled to 15.7 degrees Celsius using chilled water circulating through the reactor's outer jacket while agitating at 1250 revolutions per minute using the twin gas dispersion impellers. Carbonation was initiated by adding a 15 percent $CO_2$ at a rate of 0.84 liters $CO_2$/min admixed with 85 percent air mixture gas into the slurry in the reactor.

The reaction temperature was held under 17 degrees Celsius during the first 10 minutes of carbonation using chilled water circulating through the reactor's outer jacket. At 89 minutes into the carbonation reaction, the electrical conductivity dropped significantly, forming a characteristic drop in the trace. The $CO_2$/air mixture was stopped and an aqueous solution of polyacrylic acid (M.W.=2000) was added, with the polyacrylic acid being provided in an amount 1.20 percent dry polyacrylic acid on dry PCC by weight and the slurry was mixed for 10 minutes. The properties of the polyacrylic acid used are provided as Sample No. 1 in Table 1 below.

Addition of the $CO_2$/air mixture was then resumed at the original $CO_2$ and air flow rates and continued until the reaction mixture reached pH 8.0, indicating that the reaction was substantially complete.

Micrographs of the final product revealed the resulting calcium carbonate product consisted of platelets measuring ~0.5–1.0 microns (µm) wide by ~0.1–0.15 µm thick. X-ray diffraction (XRD) analysis showed the product to be composed of 75 percent–79 percent calcite, 15 percent–20 percent vaterite.

EXAMPLE 2

Platy PCC on 4 Liter Scale with Polyacrylic Acid Addition

The process recited above for Example 1 was repeated except that at 90 minutes into the carbonation reaction, the electrical conductivity formed the characteristic drop in the trace. The $CO_2$/air was then stopped and an aqueous solution of polyacrylic acid (M.W.=4700) was added, with the polyacrylic acid being provided in an amount 5.00% dry polyacrylic acid on dry PCC by weight and the slurry was mixed for 10 minutes. The properties of the polyacrylic acid used are provided as Sample No. 2 in Table 1 below.

Addition of the $CO_2$/air mixture was then resumed at the original $CO_2$ and air flow rates and continued until the reaction mixture reached pH 8.1, indicating that the reaction was substantially complete. The total reaction time was 140 minutes.

Micrographs of the final product revealed the resulting calcium carbonate product consisted of platelets measuring ~0.5–1.0 microns (µm) wide by 0.1–0.15 µm thick. The BET specific surface area of the product was 10.1 m²/g.

EXAMPLE 3

Platy PCC on 4 Liter Scale with Polyacrylic Acid Addition

The process recited above for Example 1 was repeated except that at 85 minutes into the carbonation reaction, the electrical conductivity formed the characteristic drop in the trace. The $CO_2$/air was then stopped and an aqueous solution of polyacrylic acid (M.W.=10,000) was added, with the polyacrylic acid being provided in an amount 5.00 percent dry polyacrylic acid on dry PCC by weight and the slurry was mixed for 10 minutes. The properties of the polyacrylic acid used are provided as Sample No. 3 in Table 1 below.

Addition of the $CO_2$/air mixture was then resumed at the original $CO_2$ and air flow rates and continued until the reaction mixture reached pH 8.0, indicating that the reaction was substantially complete. The total reaction time was 144.5 minutes.

Micrographs of the final product revealed the resulting calcium carbonate product consisted of platelets measuring ~0.5–1.0 microns (µm) wide by ~0.1–0.15 µm thick. The BET specific surface area of the product was 9.6 m²/g.

Shown in Table 1 below are properties of the polyacrylic acid additions, including their termination group, molecular weight, percent solids, and pH, and the amount of addition used for Examples 1–3 above which correspond to Sample Numbers 1–3, respectively.

TABLE 1

POLYACRYLATE ADDITIONS PROVIDED AS POLYACRYLIC ACID

| SAMPLE NUMBER | TERMI-NATION GROUP | MOLECULAR WEIGHT | SOLIDS (%) | pH | AMOUNT (% dry PAA on dry PCC) |
|---|---|---|---|---|---|
| 1 | Sulfite | 2000 | 49.0 | 2.5 | 1.20 |
| 2 | Sulfite | 4700 | 48.0 | 4.0 | 5.00 |
| 3 | Sulfite | 10,000 | 48.0 | 3.6 | 5.00 |

EXAMPLE 4

Platy PCC on 4 Liter Scale with Neutralized Polyacrylic Acid Salt

The process recited above for Example 1 was repeated except that at 93 minutes into the carbonation reaction, the electrical conductivity formed the characteristic drop in the trace. The $CO_2$/air was then stopped and an aqueous solution of a neutralized polyacrylic acid salt (M.W.=4,500) was added, with the polyacrylic acid being provided in an amount 1.40 percent dry polyacrylic acid salt on dry PCC by weight and the slurry was mixed for 10 minutes. The properties of the polyacrylic acid salt used are provided as Sample No. 4 in Table 2 below.

Addition of the $CO_2$/air mixture was then resumed at the original $CO_2$ and air flow rates and continued until the reaction mixture reached pH 8.0, indicating that the reaction was substantially complete. The total reaction time was 155 minutes.

Micrographs of the final product revealed the resulting calcium carbonate product consisted of platelets measuring ~0.4–0.9 microns (μm) wide by ~0.1–0.15 μm thick. The BET specific surface area of the product was 10.8 $m^2$/g and the particle size distributions were PSD at 90 percent=2.25 μm and PSD at 50 percent=1.44 μm. X-ray diffraction (XRD) analysis showed the product to be composed of 84 percent–87 percent calcite, 7 percent–10 percent vaterite, 2 percent–4 percent water, and 2 percent–4 percent amorphous.

EXAMPLE #5

Platy PCC on Pilot Plant Scale with Neutralized Polyacrylic Acid Salt

CaO was hydrated in $H_2O$ at 55 degrees Celsius in a two-zone ZMI PORTEC Slaker available from ZMI Portec Chemical Processing Group, Sibley, Iowa, yielding 540 gallons of $Ca(OH)_2$ slurry at 0.13 g/ml concentration. The $Ca(OH)_2$ slurry was added to an 850 gallon reactor and cooled to 17.0 degrees Celsius using a recirculating heat exchanger. 0.15 percent (by weight PCC yield) citric acid was added to the slurry while agitating at 197 rpm using twin gas dispersion impellers.

Carbonation was initiated by adding a 15 percent $CO_2$/85 percent air mixture gas into the slurry in the reactor at a rate of 31 standard cubic feet per minute $CO_2$ and 176 standard cubic feet minute air. The carbonation reaction temperature was held under 18.0° C. during the first 12 minutes of the process using the heat exchanger. At 87 minutes into the carbonation reaction, the electrical conductivity dropped significantly, forming a characteristic drop in the trace at which time an aqueous solution of a neutralized polyacrylic acid salt (M.W.=4,500) was added was added to the slurry without pausing carbonation of the slurry, with the polyacrylic acid being provided in an amount 5.0 percent dry polyacrylic acid salt on dry PCC by weight. The properties of the polyacrylic acid salt used are provided as Sample No. 5 in Table 2 below. Carbonation was continued until the pH of the reaction mixture became 7.4, indicating that the reaction was substantially complete. The total reaction time was 161 minutes.

Micrographs of the final product revealed the resulting calcium carbonate product consisted of platelets measuring ~0.4–0.8 microns (μm) wide by ~0.10 μm thick. The BET specific surface area of the product was 14.0 $m^2$/g and the particle size distributions were PSD at 90 percent<1.68 μm and PSD at 50 percent<1.04 μm.

EXAMPLE #6

Platy PCC on 4 Liter Scale with Sodium Polyacrylate

The process recited above for Example 1 was repeated except that at 87 minutes the electrical conductivity formed the characteristic drop in the trace. The $CO_2$/air was then stopped and a 1.0 percent aqueous solution (by weight dry on dry PCC yield) of a 3,600 molecular weight, sodium neutralized, phosphonate terminated polyacrylate salt was added and the slurry was mixed for 10 minutes. The properties of the polyacrylate salt used are provided as Sample No. 6 in Table 2 below.

Addition of the $CO_2$/air mixture was then resumed at the original $CO_2$ and air flow rates and continued until the reaction mixture reached pH 7.7, indicating that the reaction was substantially complete. The total carbonation time was 165 minutes. Micrographs of the final product revealed platelets measuring ~0.5–1.2 μm wide by ≦0.15 μm thick.

EXAMPLE #7

Platy PCC on 4 Liter Scale with Ammonium Polyacrylate

The process recited above for Example 1 was repeated except that at 87 minutes the electrical conductivity formed the characteristic drop in the trace. The $CO_2$/air was stopped and a 2.45 percent aqueous solution (by weight dry on dry PCC yield) of a 3,400 molecular weight, ammonium neutralized, phosphonate-terminated polyacrylate salt was added and the slurry was mixed for 10 minutes. The properties of the polyacrylate salt used are provided as Sample No. 7 in Table 2 below.

Addition of the $CO_2$/air mixture was then resumed at the original $CO_2$ and air flow rates and continued until the reaction mixture reached pH 9.8, indicating that the reaction was substantially complete. The total carbonation time was 165 minutes. Micrographs of the final product revealed platelets measuring ~0.4–1.0 μm wide by ≦0.15 μm thick.

EXAMPLE 8

Platy PCC on 4 Liter Scale with Sodium Polyacrylate

The process recited above for Example 1 was repeated except at 90 minutes the electrical conductivity formed the characteristic drop in the trace. The $CO_2$/air was stopped and a 1.96 percent aqueous solution (by weight dry on dry PCC yield) of a 2,000 molecular weight, sodium neutralized, phosphonate-terminated polyacrylate salt was added and the slurry was mixed for 10 minutes. The properties of the polyacrylate salt used are provided as Sample No. 8 in Table 2 below.

Addition of the $CO_2$/air mixture was then resumed at the original $CO_2$ and air flow rates and continued until the reaction mixture reached pH 8.8, indicating that the reaction was substantially complete. The total carbonation time was 160 minutes. Micrographs of the final product revealed platelets measuring ~0.5–0.9 μm wide by ≦0.15 μm thick. The BET specific surface area of the product was 13.1 $m^2/g$ and the particle size distribution was PSD at 50 percent=1.05 μm.

EXAMPLE 9

Platy PCC on 4 Liter Scale with Sodium Polyacrylate

The process recited above for Example 1 was repeated except at 89 minutes the electrical conductivity formed the characteristic drop in the trace. The $CO_2$/air was stopped and a 1.96 percent aqueous solution (by weight dry on dry PCC yield) of a 2,600 molecular weight, sodium neutralized, phosphonate-terminated polyacrylate salt was added to the slurry and mixed for 10 minutes. The properties of the polyacrylate salt used are provided as Sample No. 9 in Table 2 below.

Addition of the $CO_2$/air mixture was then resumed at the original $CO_2$ and air flow rates and continued until the reaction mixture reached pH 8.9, indicating that the reaction was substantially complete. The total carbonation time was 145 minutes. Micrographs of the final product revealed platelets measuring ~0.5–1.0 μm wide by ≦0.20 μm thick. The BET specific surface area of the product was 13.2 $m^2/g$ and the particle size distribution was PSD at 50 percent=1.20 μm.

EXAMPLE 10

Platy PCC on 4 Liter Scale with Sodium Polyacrylate

The process recited above for Example 1 was repeated except at 90 minutes the electrical conductivity formed the characteristic drop in the trace. The $CO_2$/air was stopped and a 1.96 percent aqueous solution (by weight dry on dry PCC yield) of a 3,500 molecular weight, sodium neutralized, phosphonate-terminated polyacrylate salt was added to the slurry and mixed for 10 minutes. The properties of the polyacrylate salt used are provided as Sample No. 10 in Table 2 below.

Addition of the $CO_2$/air mixture was then resumed at the original $CO_2$ and air flow rates and continued until the reaction mixture reached pH 8.6, indicating that the reaction was substantially complete. The total carbonation time was 183 minutes. Micrographs of the final product revealed platelets measuring ~0.5–1.0 μm wide by ≦0.15 μm thick. The BET specific surface area of the product was 14.5 $m^2/g$ and the particle size distribution was PSD at 50 percent=0.951 μm.

EXAMPLE 11

Platy PCC on 4 Liter Scale with Sodium Polyacrylate

The process recited above for Example 1 was repeated except at 87 minutes the electrical conductivity formed the characteristic drop in the trace. The $CO_2$/air was stopped and a 1.96 percent aqueous solution (by weight dry on dry PCC yield) of a 4,800 molecular weight, sodium neutralized, phosphonate-terminated polyacrylate salt was added to the slurry and mixed for 10 minutes. The properties of the polyacrylate salt used are provided as Sample No. 11 in Table 2 below.

Addition of the $CO_2$/air mixture was then resumed at the original $CO_2$ and air flow rates and continued until the reaction mixture reached pH 8.8, indicating that the reaction was substantially complete. The total carbonation time was 152 minutes. Micrographs of the final product revealed platelets measuring ~0.4–0.8 μm wide by ≦0.201 μm thick. The BET specific surface area of the product was 13.3 $m^2/g$ and the particle size distribution was PSD at 50 percent=0.93 μm.

EXAMPLE 12

Platy PCC on 4 Liter Scale with Sodium Polyacrylate

The process recited above for Example 1 was repeated except at 84 minutes the electrical conductivity formed the characteristic drop in the trace. The $CO_2$/air was stopped and a 1.96 percent aqueous solution (by weight dry on dry PCC yield) of a 6,000 molecular weight, sodium neutralized, phosphonate-terminated polyacrylate salt was added to the slurry and mixed for 10 minutes. The properties of the polyacrylate salt used are provided as Sample No. 12 in Table 2 below.

Addition of the $CO_2$/air mixture was then resumed at the original $CO_2$ and air flow rates and continued until the reaction mixture reached pH 8.4, indicating that the reaction was substantially complete. The total carbonation time was 180 minutes. Micrographs of the final product revealed platelets measuring ~0.5–0.9 μm wide by ≦0.15 μm thick. The BET specific surface area of the product was 14.8 $m^2/g$ and the particle size distribution was PSD at 50 percent=1.27 μm.

EXAMPLE 13

Platy PCC on 4 Liter Scale with Sodium Polyacrylate

The process recited above for Example 1 was repeated except at 86 minutes the electrical conductivity formed the characteristic drop in the trace. The $CO_2$/air was stopped and a 1.96 percent aqueous solution (by weight dry on dry PCC yield) of an 8,000 molecular weight, sodium neutralized, phosphonate-terminated polyacrylate salt was added to the slurry and mixed for 10 minutes. The properties of the polyacrylate salt used are provided as Sample No. 13 in Table 2 below.

Addition of the $CO_2$/air mixture was then resumed at the original $CO_2$ and air flow rates and continued until the reaction mixture reached pH 8.7, indicating that the reaction was substantially complete. The total carbonation time was 154 minutes. Micrographs of the final product revealed platelets measuring ~0.4–1.0 μm wide by ≦0.20 μm thick. The BET specific surface area of the product was 8.7 m$^2$/g and the particle size distribution was PSD at 50 percent=0.98 μm.

The BET specific surface area of the product was 12.9 m$^2$/g and the particle size distribution was PSD at 50 percent=1.20 μm.

Shown in Table 2 below are properties of the polyacrylate acid salt additions, including their termination group, neutralization, molecular weight, percent solids, and initial pH, and the amount of addition used for Examples 4–14 above which correspond to Sample Numbers 4–14, respectively.

TABLE 2

POLYACRYLATE ADDITIONS PROVIDED AS NEUTRALIZED POLYACRYLIC ACID SALTS

| SAMPLE NO. | TERMINATION GROUP | NEUTRALIZATION | MOLECULAR WEIGHT | SOLIDS (%) | PH | AMOUNT (% dry PAA on dry PCC) |
|---|---|---|---|---|---|---|
| 4 | Sulfite | Sodium | 4500 | 45.0 | 7.5 | 1.40 |
| 5 | Sulfite | Sodium | 4500 | 45.0 | 7.5 | 5.00 |
| 6 | Phosphonate | Sodium | 3600 | 40.0 | 7.0 | 1.00 |
| 7 | Phosphonate | Ammonium | 3400 | 40.0 | 7.0 | 2.45 |
| 8 | Phosphonate | Sodium | 2000 | 43.0 | 7.0 | 1.96 |
| 9 | Phosphonate | Sodium | 2600 | 43.0 | 7.0 | 1.96 |
| 10 | Phosphonate | Sodium | 3500 | 43.0 | 7.0 | 1.96 |
| 11 | Phosphonate | Sodium | 4800 | 42.0 | 7.0 | 1.96 |
| 12 | Phosphonate | Sodium | 6000 | 44.1 | 7.2 | 1.96 |
| 13 | Phosphonate | Sodium | 8000 | 45.2 | 7.0 | 1.96 |
| 14 | Sulfite | Sodium | 2200 | 43.0 | 7.0 | 2.94 |
| 15 | Sulfite | Sodium | ~4000 | 40.0 | 7.0 | 2.00 |

EXAMPLE 14

Platy PCC on 4 Liter Scale with Sodium Polyacrylate

The process recited above for Example 1 was repeated except at 86 minutes the electrical conductivity formed the characteristic drop in the trace. The CO$_2$/air was stopped and a 2.94 percent aqueous solution (by weight dry on dry PCC yield) of a 2,200 molecular weight, sodium neutralized, sulfite-terminated polyacrylate salt was added to the slurry and mixed for 10 minutes. The properties of the polyacrylate salt used are provided as Sample No. 14 in Table 2 below.

Addition of the CO$_2$/air mixture was then resumed at the original CO$_2$ and air flow rates and continued until the reaction mixture reached pH 8.7, indicating that the reaction was substantially complete. The total carbonation time was 138 minutes. Micrographs of the final product revealed platelets measuring ~0.5–1.0 μm wide by ≦0.10 μm thick. The BET specific surface area of the product was 14.6 m$^2$/g and the particle size distribution was PSD at 50 percent=0.76 μm.

EXAMPLE 15

Platy PCC on 4 Liter Scale with Sodium Polyacrylate

The process recited above for Example 1 was repeated except at 82 minutes the electrical conductivity formed the characteristic drop in the trace. The CO$_2$/air was stopped and a 2.00 percent aqueous solution (by weight dry on dry PCC yield) of a 4,000 molecular weight, sodium neutralized, sulfite-terminated polyacrylate salt was added to the slurry and mixed for 10 minutes. The properties of the polyacrylate salt used are provided as Sample No. 15 in Table 2 below.

Addition of the CO$_2$/air mixture was then resumed at the original CO$_2$ and air flow rates and continued until the reaction mixture reached pH 8.3, indicating that the reaction was substantially complete. The total carbonation time was 173 minutes. Micrographs of the final product revealed platelets measuring ~0.6–1.0 μm wide by ≦0.20 μm thick.

To evaluate the effectiveness of other polycarboxylic acids, experiments were performed using other polycarboxylate additions, namely, poly(aspartic acid) and carboxymethylcellulose, the results for which are set forth in detail below.

Poly(aspartic acid) is a polycarboxylate polymer containing a mine and carboxylic acid groups for which a sodium-neutralized polyaspartate, available as Donlaro® A-3C polyaspartate from Donlar Corp., Bedford Park, Ill., was investigated.

COMPARATIVE EXAMPLE 1

200 grams of CaO was hydrated in 2.00 liters of H$_2$O at 45 degrees Celsius for 10 minutes while mixing at 750 revolutions per minute with twin gas dispersion impellers. The resulting Ca(OH)$_2$ slurry concentration was 0.12 g/ml. The Ca(OH)$_2$ slurry was added to a 4 liter reactor and cooled to 16.1 degrees Celsius while agitating at 1250 revolutions per minute using twin gas dispersion impellers. Carbonation was started by bubbling a 15 percent CO$_2$ in air mixture into the slurry at 0.80 liters CO$_2$ per minute. The reaction temperature was held under 17 degrees Celsius during the first 10 minutes of the process using chilled water circulating through the reactor's outer jacket. At 98 minutes into the reaction, the electrical conductivity dropped significantly, forming a characteristic drop in the trace. The CO$_2$/air was stopped and a 0.5 percent aqueous solution (by weight dry on dry PCC yield) of a 3,200 molecular weight poly(aspartic acid), sodium salt (Donlar® A-3C, 40 percent solids) was added to the slurry and mixed for 10 minutes. The carbonation was resumed at the original CO$_2$/air flowrates until the slurry reached pH 8.0. The total reaction time was 155 minutes. Micrographs of the final product revealed prismatic calcite crystals. No platy or plate-shaped crystals were seen.

COMPARATIVE EXAMPLE 2

The process recited above for Comparative Example 1 was repeated except at 96 minutes into the reaction, the electrical conductivity dropped significantly, forming a characteristic drop in the trace. The $CO_2$/air was stopped and a 1.5 percent aqueous solution (by weight dry on dry PCC yield) of the Donlar® A-3C sodium polyaspartate was added to the slurry and mixed for 10 minutes. The carbonation was resumed at the original $CO_2$/air flowrates until the slurry reached pH 8.0. The total reaction time was 156 minutes. Micrographs of the final product revealed prismatic calcite crystals. No platy or plate-shaped crystals were seen.

COMPARATIVE EXAMPLE 3

The process recited above for Comparative Example 1 was repeated except at 94 minutes into the reaction, the electrical conductivity dropped significantly, forming a characteristic drop in the trace. The $CO_2$/air was stopped and a 3.0 percent aqueous solution (by weight dry on dry PCC yield) of the Donlar® A-3C sodium polyaspartate was added to the slurry and mixed for 10 minutes. The carbonation was resumed at the original $CO_2$/air flowrates until the slurry reached pH 8.0. The total reaction time was 153 minutes. Micrographs of the final product revealed prismatic calcite crystals. No platy or plate-shaped crystals were seen.

Carboxymethylcellulose (CMC) is a polycarboxylate polymer chain of highly substituted ring structures containing carboxylic acid groups for which two different chain lengths (M.W.), available as FINNFIX from Metsa-Serla Chemicals OY, Äänekoski, Finland, were investigated.

COMPARATIVE EXAMPLE 4

210 grams of CaO was hydrated in 2.10 liters of $H_2O$ at 40 degrees Celsius for 10 minutes while mixing at 1000 revolutions per minute with twin gas dispersion impellers. The resulting $Ca(OH)_2$ slurry concentration was 0.12 g/ml. The $Ca(OH)_2$ slurry was added to a 4 liter reactor and cooled to 15.0 degrees Celsius while agitating at 1250 revolutions per minute using twin gas dispersion impellers. Carbonation was started by bubbling a 15 percent $CO_2$ in air mixture into the slurry at 0.80 liters $CO_2$ per minute. The reaction temperature was held under 16 degrees Celsius during the first 10 minutes of the process using chilled water circulating through the reactor's outer jacket. At 85 minutes into the reaction, the electrical conductivity dropped significantly, forming a characteristic drop in the trace. The $CO_2$/air was stopped and a 1.0 percent aqueous solution (by weight dry on dry PCC yield) of a 2,000 molecular weight carboxymethylcellulose (FINNFIX 2) w added to the slurry and mixed for 5 minutes. The carbonation was resumed at the original $CO_2$/air flowrates until the slurry reached pH 7.8. The total reaction time was 140 minutes. Micrographs of the final product revealed large prismatic calcite crystals. No platy or plate-shaped crystals were seen.

COMPARATIVE EXAMPLE 5

The process recited above for Comparative Example 4 was repeated except at 87 minutes into the reaction, the electrical conductivity dropped significantly, forming a characteristic drop in the trace. The $CO_2$/air was stopped and a 5.0 percent aqueous solution (by weight dry on dry PCC yield) of FINNFIX 2 was added to the slurry and mixed for 5 minutes. The carbonation was resumed at the original $CO_2$/air flowrates until the slurry reached pH 7.5. The total reaction time was 150 minutes. Micrographs of the final product revealed large prismatic calcite crystals. No platy or plate-shaped crystals were seen.

COMPARATIVE EXAMPLE 6

The process recited above for Comparative Example 4 was repeated except at 89 minutes into the reaction, the electrical conductivity dropped significantly, forming a characteristic drop in the trace. The $CO_2$/air was stopped and a 1.0 percent aqueous solution (by weight dry on dry PCC yield) of a 10,000 molecular weight carboxymethylcellulose (FINNFIX 10) was added to the slurry and mixed for 5 minutes. The carbonation was resumed at the original $CO_2$/air flowrates until the slurry reached pH 7.5. The total reaction time was 145 minutes. Micrographs of the final product revealed large prismatic calcite crystals. No platy or plate-shaped crystals were seen.

COMPARATIVE EXAMPLE 7

The process recited above for Comparative Example 4 was repeated except at 90 minutes into the reaction, the electrical conductivity dropped significantly, forming a characteristic drop in the trace. The $CO_2$/air was stopped and a 5.0 percent aqueous solution (by weight dry on dry PCC yield) of FINNFIX 10 was added to the slurry and mixed for 5 minutes. The carbonation was resumed at the original $CO_2$/air flowrates until the slurry reached pH 7.6. The total reaction time was 145 minutes. Micrographs of the final product revealed large prismatic calcite crystals. No platy or plate-shaped crystals were seen.

In reviewing the polyacrylates tested, several trends were generally observed. First, polyacrylates according to the present invention having lower molecular weights are more effective than those having higher molecular weights. Second, of the polyacrylic acid salts of the present invention, those that are sodium-neutralized are more effective additives than those that are ammonium-neutralized. Third, both the polyacrylic acid and the neutralized polyacrylic acid salts according to the present invention are effective additives in the formation of platy-PCC. Fourth, although the polyacrylates of the present invention are polycarboxylic acids, not all polycarboxylic acids are effective additions for precipitating platy-PCC.

According to the process of the present invention, platy precipitated calcium carbonate is produced that may be used as a pigment for a variety of applications such as a filler or coating formulation for paper.

While embodiments and application of this invention have been shown and described, it will be appreciated by those skilled in the art that modifications and embodiments are possible without departing from the inventive concepts herein described. For example, although embodiments are shown and described above with respect to respect to small batch and continuous pilot plant batch processes, it will be apparent to those skilled in the art that these processes may be provided as full-scale batch or continuous reactions. Therefore, it is intended that the appended claims cover all such modifications and embodiments that fall within the true spirit and scope of the present invention.

BRIEF DESCRIPTION OF THE DRAWINGS

Novel features and advantages of the present invention will become apparent to those skilled in the art from a reading of the following detailed description in conjunction with the accompanying drawings, wherein:

FIG. 2 is a schematic drawing of a precipitated calcium carbonate particle illustrating the dimensional characteristics of the substantially platy morphology according to the present invention.

Figure 1:
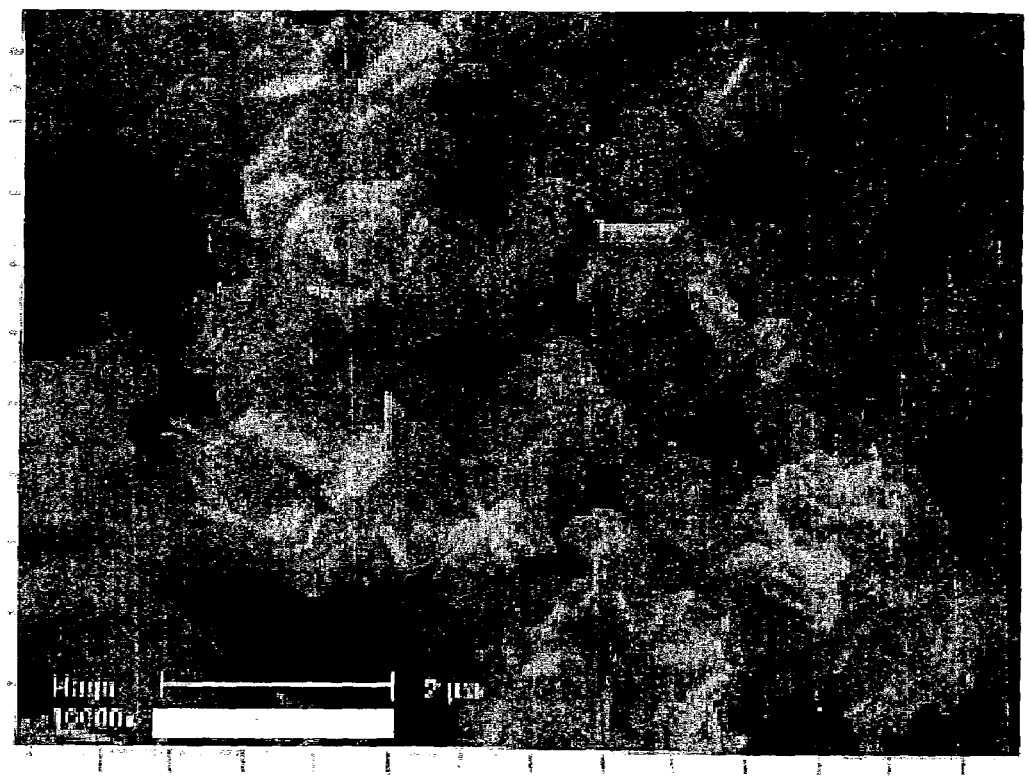
FIG. 1 is a photomicrograph at a magnification of 10,000× of the precipitated calcium carbonate of substantially platy morphology according to the present invention.

What is claimed is:

1. A process for the preparation of platy precipitated calcium carbonate comprising the steps of:
providing a suspension of calcium hydroxide,
carbonating the suspension of calcium hydroxide,
adding a polyacrylate to the suspension wherein the polyacrylate is added during the characteristic drop in specific conductivity of the suspension that occurs at about 60 to about 70 percent carbonation.

2. The process for the preparation of platy precipitated calcium carbonate according to claim 1, wherein the step of providing a suspension of calcium hydroxide is comprised of hydrating lime to form the calcium hydroxide suspension having a concentration of about 0.09 grams to about 0.14 grams calcium hydroxide per milliliter of suspension.

3. The process for the preparation of platy precipitated calcium carbonate according to claim 1, wherein the initial temperature of the suspension of calcium hydroxide prior to carbonation is in a range from about 8 degrees Celsius to about 18 degrees Celsius.

4. The process for the preparation of platy precipitated calcium carbonate according to clam 1, wherein citric acid is added in an amount up to about 0.15 percent dry citric acid on dry PCC by weight.

5. The process for the preparation of platy precipitated calcium carbonate according to claim 1, wherein the step of carbonating the suspension is performed until the pH of the resultant solution reaches about 7.5 to about 8.0.

6. The process for the preparation of platy precipitated calcium carbonate according to claim 1, wherein the step of adding a polyacrylate to the suspension is performed without discontinuing the step of carbonating the suspension.

7. The process for the preparation of platy precipitated calcium carbonate according to claim 1, wherein the step of adding a polyacrylate is performed by discontinuing the carbonating step, adding the polyacrylate as an aqueous solution, mixing the suspension, and resuming carbonating the suspension to precipitate platy PCC.

8. The process for the preparation of platy precipitated calcium carbonate according to claim 1, wherein the polyacrylate is added to the suspension during carbonation when the specific conductivity decreases at a rate of about 0.02 milliSiemens to about 0.04 milliSiemens per centimeter per second.

9. The process for the preparation of platy precipitated calcium carbonate according to claim 1, wherein the polyacrylate added to the suspension is selected from the group consisting of a polyacrylic acid and a neutralized polyacrylic acid salt.

10. The process for the preparation of platy precipitated calcium carbonate according to claim 1, wherein the polyacrylate added to the suspension has a molecular weight of from about 2,000 to about 10,000.

11. The process for the preparation of platy precipitated calcium carbonate according to claim 1, wherein the polyacrylate is added in an amount of at least about 1 percent by weight of dry polyacrylate on dry PCC yield.

* * * * *